United States Patent [19]
Grantham

[11] Patent Number: 6,149,699
[45] Date of Patent: *Nov. 21, 2000

[54] METHOD AND APPARATUS RELATING TO DISPOSABLE FILTER MODULES FOR FILTERING AIR CONTAINING HAZARDOUS SUBSTANCES

[76] Inventor: James I. Grantham, P.O. Box 31442, Raleigh, N.C. 27622

[*] Notice: This patent issued on a continued prosecution application filed under 37 CFR 1.53(d), and is subject to the twenty year patent term provisions of 35 U.S.C. 154(a)(2).

[21] Appl. No.: 08/926,999

[22] Filed: Jul. 15, 1997

Related U.S. Application Data

[63] Continuation of application No. 08/357,051, Dec. 14, 1994, abandoned, which is a continuation of application No. 07/993,717, Dec. 14, 1992, abandoned.

[51] Int. Cl.$^7$ ................................................ B01D 50/00
[52] U.S. Cl. .......................... 55/385.2; 55/429; 55/432; 96/136; 96/138; 96/139
[58] Field of Search .................... 55/385.2, 429, 55/432, DIG. 9; 96/135–136, 138–139

[56] References Cited

U.S. PATENT DOCUMENTS

| 3,402,530 | 9/1968 | Agnon | 55/DIG. 9 |
|---|---|---|---|
| 3,690,045 | 9/1972 | Neumann | 55/DIG. 9 |
| 4,266,955 | 5/1981 | Hackney | 55/DIG. 9 |
| 4,450,964 | 5/1984 | Wood | 55/DIG. 9 |
| 4,695,299 | 9/1987 | Spadaro et al. | 55/429 |
| 5,037,159 | 8/1991 | Nutter et al. | 55/429 |
| 5,131,931 | 7/1992 | Miley et al. | 55/97 |

*Primary Examiner*—Krisanne Thornton
*Attorney, Agent, or Firm*—William H. Holt

[57] ABSTRACT

Rather than providing replaceable filter elements in fixed permanent housings which require replacement by plastic bagging techniques, easily disposable and incineratable filter modules are removed and replaced as integral units while providing complete protection against contaminants from filtered exhaust air from enclosures containing airborne or potentially airborne hazardous materials, such as biological safety cabinets, fume hoods, cages for contaminated animals, nuclear facilities, etc. The disposable filter modules are removable and replaceable by a technique in which the modules are maintained under negative pressure via a filtered vacuum source at all times while the module inlets and outlets are open. Sealing of the openings is by small sheets of polyethylene film, and no bagging such as in the known "bag in, bag out" technique is required.

18 Claims, 3 Drawing Sheets

METHOD AND APPARATUS RELATING TO DISPOSABLE FILTER MODULES FOR FILTERING AIR CONTAINING HAZARDOUS SUBSTANCES This is a continuation of application Ser. No. 08/357,051 filed Dec. 14, 1994, now abandoned which is a continuation of application Ser. No. 07/993,717 filed Dec. 14, 1992, abandoned.

FIELD OF THE INVENTION

This invention relates generally to the filtration of airflow, but more particularly to the filtration of hazardous materials from contaminated air, such as carcinogenladen air, radioactive gases, etc., emanating from contamination control rooms, biological safety cabinets, fume hoods, animal rooms or cages for contaminated animals, contaminated containment rooms, or nuclear facilities or laboratories containing nuclear contamination, as representative applications. More specifically, the present invention involves new, efficient and safe apparatus and methods for removal and replacement of contaminated filter elements in filtered exhaust systems from the above exemplary areas, utilizing disposable filter modules which are removable and replaceable as integral units, with the removed contaminated modules being safely disposable by incineration, for example.

BACKGROUND OF THE INVENTION

In the field of filtration of hazardous materials from large scale airflow systems, and more specifically in the field of removal, disposal and replacement of contaminated filter elements, typical known techniques involve removal of the filter element itself from within its essentially permanently fixed housing, and replacement by a new filter element in the same housing. Perhaps the most prevalent known techniques have emphasized the use of plastic bags to contain the filter element during removal and handling as the filter element is removed from the fixed housing. Perhaps the leading known system is what is referred to as the "bag-in, bag-out" technique of filter replacement. This technique is disclosed in U.S. Pat. No. 3,354,616 issued Nov. 28, 1967, and similar processes are disclosed in U.S. Pat. Nos. 4,334,896 issued Jun. 15, 1982, and 3,402,530 issued Sep. 24, 1968. Generally, the "bag-in, bag-out" technique involves the use of a filter housing unit integrated into the exhaust duct system, the housing containing one or more filter elements and having an opening communicating with the location of the filter element. About the opening is affixed the end of a plastic bag, thereby sealing off the enclosure to the outside. A more permanent lid is also generally provided for sealing over the plastic bag whereby the bag is compacted for storage behind the lid while still affixed to the mouth of the opening. With the rigid lid removed, the operator reaches in for the filter element, and is protected from the contaminated air by the plastic bag. He then manipulates the filter element through the opening and into the bag. The entire filter element is thus enclosed by the plastic bag, and the bag is then crimped between the filter element and the mouth of the housing opening, and heat sealed along that line. This heat sealing creates a complete enclosure of the filter element within the bag, and the bag may then be cut along the line of the heat seal, separating the bagged filter element from the housing, with the housing remaining sealed by virtue of the heat sealed stump of the plastic bag affixed over the mouth of the housing opening. Another bag containing a new filter element is then sealed over the existing plastic stump on the mouth of the opening, and the stump is removed and heat sealed off into a small pocket of the new plastic bag, after which this pocket is cut off and disposed of. The new filter is then moved through the opening out of the plastic bag and into position within the housing. The new plastic bag is then rolled up and placed for storage behind the solid lid which has been secured over the opening. The "bag-in, bag-out" technique described above, while rather widely used, does have certain disadvantages. In particular, it may be extremely awkward and difficult to handle large filters by hand, especially carbon filters which may exceed 200 pounds in weight. Additionally, the use of large plastic bags and the need to manipulate the filters through such bags presents the risk that the bags (upon which the safety of the procedure relies) may be easily punctured by the large filter elements or by simple operator mishandling. The reliance upon the heat sealing of the plastic bags presents a further potential for imperfect sealing and failure-of the plastic enclosure.

The present invention addresses the problems of the "bag-in, bag-out" technique by replacing the large permanent fixed filter housing with a removable and disposable filter module comprising both a filter element or elements and a disposable housing for the element or elements. The invention thus involves the provision of filter modules for use in this particular field which can be safely, quickly and efficiently, as well as economically, removed and disposed of as integral units, and simultaneously replaced by similar filter modules. A particular feature of the invention involves the method by which a used disposable filter module can be removed and replaced safely and without exposure of the technician to hazardous materials in the module itself and in its associated ducting. Thus, the invention involves both method and apparatus aspects. I am aware that small disposable filter canisters for use in or with HEPA-filtered vacuum cleaners are known in the published prior art (e.g., U.S. Pat. Nos. 4,613,348 issued Sep. 23, 1986, and 4,726,825 issued Feb. 23, 1988), for use in conjunction with a separate vacuum cleaner device having a suction hose, or for use with a portable vacuum motor assembly removably mounted on top of the canister, typically for use in entrapping asbestos-containing dust. The only such examples of which I am aware relate to portable vacuum cleaners or the like, of a relatively small size, and I am not aware of any proposal for the modification of such disposable canisters to the size scale and for permanent ducting installations of the type to which the present invention relates. I would consider it unlikely that persons skilled in the art to which the present invention relates would view known small disposable filter canisters for vacuum cleaners as providing any concept or solution in connection with the problem of coming up with an improved alternative to the established "bag-in, bag-out" techniques described above in systems to which those techniques relate.

FEATURES AND ASPECTS OF THE INVENTION

In accordance with the present invention, substantially rigid integral disposable filter modules are releasably but sealingly connected between sections of exhaust ducting communicating with an enclosure containing airborne or potential airborne hazardous substances. A module comprises a substantially rigid air-tight hollow body having an inlet and an outlet defined by releasable connecting means located relatively upstream and downstream of each other relative to the direction of airflow therethrough. The hollow body has at least one filter fixedly mounted therein and sealed in the hollow body such that substantially all airflow from the inlet to the outlet passes through the filter or filters. The module is constructed and arranged so as to be connectible and disconnectible in and from the ducting as an integral unit and to be disposable and replaceable by another such module at the end of the useful life of the filter. The module typically is constructed of completely incineratable materials, such as sheet aluminum and other materials as easily incineratable as aluminum. The disposable module typically is connected with substantially rigid permanent ducting, and the releasable seal connections comprise abutting flanges. The inlet and the outlet of the hollow body project outwardly of the hollow bodies so as to be accessible to be encased and sealed by flexible sheet material such as plastic upon disconnection preparatory to removal of the module from the exhaust ducting. Thus, rather than large plastic bags or the like, the only sealing involved in the present invention requires relatively small plastic sheets sufficient to be sealingly secured about inlet and outlet openings. For safe removal, the module further includes a normally closed openable port for selective connection to a vacuum source so as to selectively maintain the module interior under negative pressure when the inlet or outlet is open during removal or installation of the module. The port preferably communicates with the interior of the hollow body downstream of the filter mounted therein. The module may incoporate a HEPA filter for particulate filtration or a carbon filter for removal of gases and vapors, and typically there are separate HEPA filter modules and carbon filter modules arranged sequentially in the exhaust duct, with the HEPA filter module upstream. In such a case, there preferably is included an isolation valve in the flow path between the modules for selectively isolating the carbon filter module from the HEPA filter module to permit biological or other decontamination of the HEPA filter without adversely affecting the carbon filter.

In the removal of a disposable filter module in accordance with the invention, exhaust flow through the module is terminated, and the hollow body interior is communicated with a filtered vacuum source via the selectively openable and closable port to effect a negative pressure in the hollow body interior. This is followed by releasing one of the releasable connecting means of the hollow body from its duct connection, separating the released connecting means from its duct connection by a small gap sufficient to receive a sheet of plastic film, inserting sheets of plastic film in the gap and sealingly securing the film separately over the released connecting means and its released duct connection, repeating the releasing and film securing steps for the other of the releasable connecting means and its duct connection, terminating the vacuum source communication and closing the port, removing the module as an integral unit, and disposing of it. As an important feature of the removal technique for safety purposes, the first released one of the connecting means is the upstream inlet connecting means, and the plastic film is not sealingly secured over the released connecting means before the plastic film is sealingly secured to its released duct connection so that the negative pressure effect in the hollow body interior exists at the gap while the released duct connection is open. Thus, any airflow from the released duct connection will still be into the filter module until the released duct connection is sealed, after which the released connecting means of the module is sealed.

In installing a new module in place of the removed module, the new module typically will be received with its inlet and outlet sealed by plastic film, particularly in the case of a carbon filter module, so as to protect the carbon filter until installed. Again, the module inlet and outlet are unsealed, the new module is communicated with a filtered vacuum source via the selectively openable and closable port to effect a negative pressure in the interior of the new module, the plastic film is removed from the released duct connections so as to expose the duct sections to the negative pressure in the filter module, and the released duct connections are connected to the releasable connecting means of the new module, after which the vacuum source communication is terminated and the port is closed. As to sequence, the plastic film on the upstream duct connection is removed before the downstream duct connection is unsealed, and the upstream duct connection is connected to the upstream releasable connecting means of the new module, followed by removal of the plastic film from the downstream duct connection and connection thereof with the downstream releasable connecting means of the new module; such that the more contaminated upstream duct part is reopened and reconnected first, and such that flow from the upstream duct through the module is through the filter of the module and hence into the filtered vacuum source.

Other features, aspects, objects and advantages of the present invention will be apparent to those skilled in the art from the ensuing description of preferred embodiments taken in conjunction with the appended drawings.

BRIEF DESCRIPTION OF THE DRAWINGS

FIG. 5 is a diagrammatic illustration of a typical system with redundant filtered flow paths either of which can be used separately or both of which can be used simultaneously.

DESCRIPTION OF PREFERRED EMBODIMENTS

Figure 1:
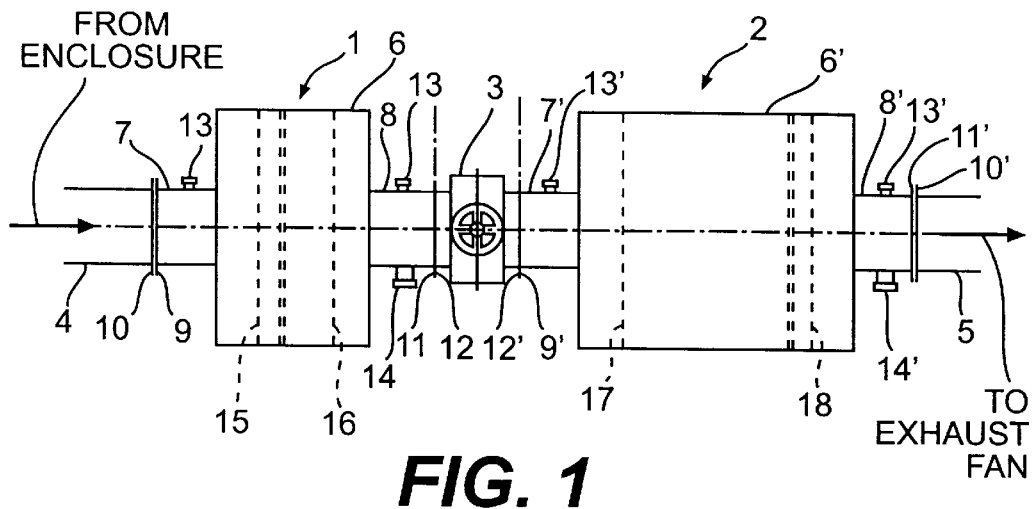
FIG. 1 is a diagrammatic view of a contaminated exhaust system incorporating-in the ducting a HEPA filter module followed by a carbon filter module, the two modules being joined via an optional isolation valve.

Referring to FIG. 1, spaced rigid duct sections 4 and 5, typically of sheet metal, extend from an enclosure to an exhaust fan or blower via a filter system of modules in accordance with the present invention, filter module 1 being a HEPA filter module and filter module 2 being a carbon filter module. The two filter modules are interconnected by an optional zero leakage isolation valve 3 to permit isolation of the carbon filter module 2 from HEPA filter module 1, and indeed many installations in accordance with the invention will include additional isolation valves such that each filter module can be completely isolated from the remainder of the system. HEPA filter module 1 comprises a substantially rigid, air-tight hollow body 6 fabricated of aluminum sheeting (typically 0.90 inch), with welded corners, and leak tight at ten inches water gauge pressure. Body 6 includes inlet duct section 7 of sheet aluminum, to which is welded a gasketed flange 9 forming a releasable connection to flange 10 of duct section 4. A corresponding outlet duct 8 terminates in a gasketed flange 11 releasably connected to flange 12 of optional isolation valve 3, and alternatively connectable directly to flange 9' of inlet duct 7' of carbon filter module 2. HEPA filter module 1 is provided with test/decontamination ports 13, typically ¾ inch pipe nipples with caps, and with a vacuum connection port 14, also comprising a welded pipe nipple with a removable cap for connection to a filtered vacuum source during removal or installation of the module. Secured and sealed in place inside the hollow body 6 are a 35% efficient pleated prefilter 15 held in place by clips affixed to the inside of the aluminum filter, and a HEPA filter 16 of 99.99% efficiency on 0.3 micrometer particles and constructed with an aluminum frame, aluminum separators, and polyurethane sealant. Corresponding elements in carbon filter module 2 are indicated by the same primed reference characters and carbon filter module 2 is of quite similar construction, apart from the filters themselves. The carbon filter module 2 contains a carbon filter 17 and a 35% efficient pleated postfilter 18 held in place by clips affixed to the inside of the aluminum housing. The carbon filter 17 typically is held in place with screws and sealed to prevent bypass. Both filter modules are completely incineratable. As shown, the contaminated air flows sequentially through HEPA filter module 1 and, carbon filter module 2.

Figure 2:
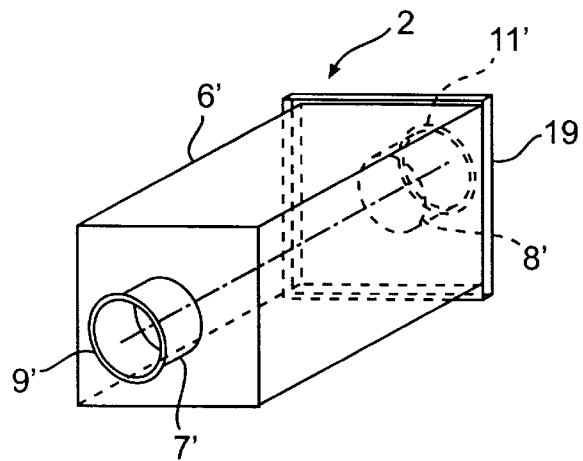
FIG. 2 is a perspective view of a typical module body shell, before installation of the filters and without the test/decontamination ports and the vacuum port.

An exemplary carbon filter module shell casing is shown in FIG. 2, and includes a bolted and sealed end closure 19. The entire casing is fabricated of sheet aluminum with welded connections, with the inlet and outlet ports being typically 8 inches diameter and welded in place. The flanges typically may be 0.1875 inch aluminum welded to the inlet and outlet ducts, and punched with, for example, eight 5/16 inch holes evenly spaced to receive connecting bolts. Gaskets (not shown) typically are secured to the flanges by adhesive.

Figure 3A:
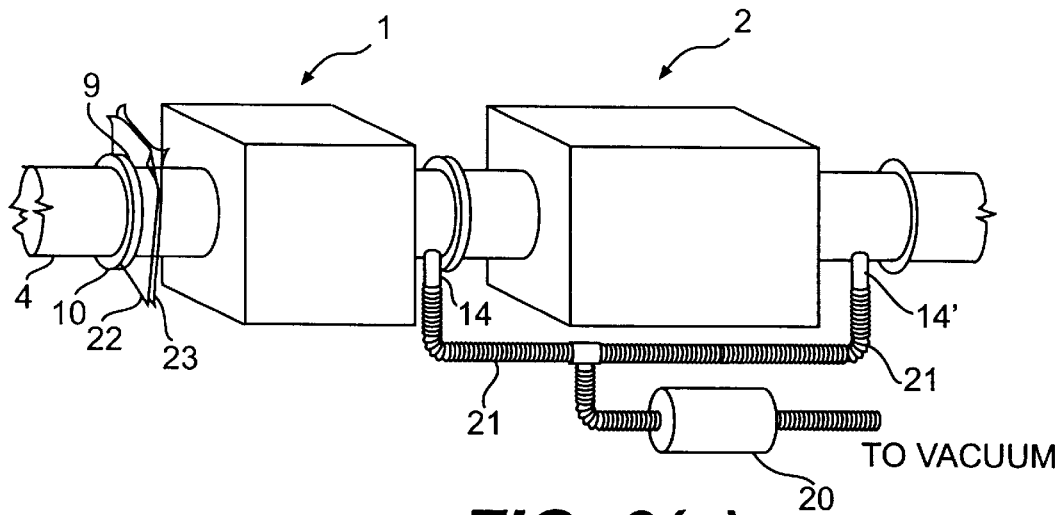
FIGS. 3(a), 3(b) and 3(c) are diagrammatic perspectives showing an exemplary sequence involved in the removal of a filter module, in this case the HEPA filter module.
Figure 3B:
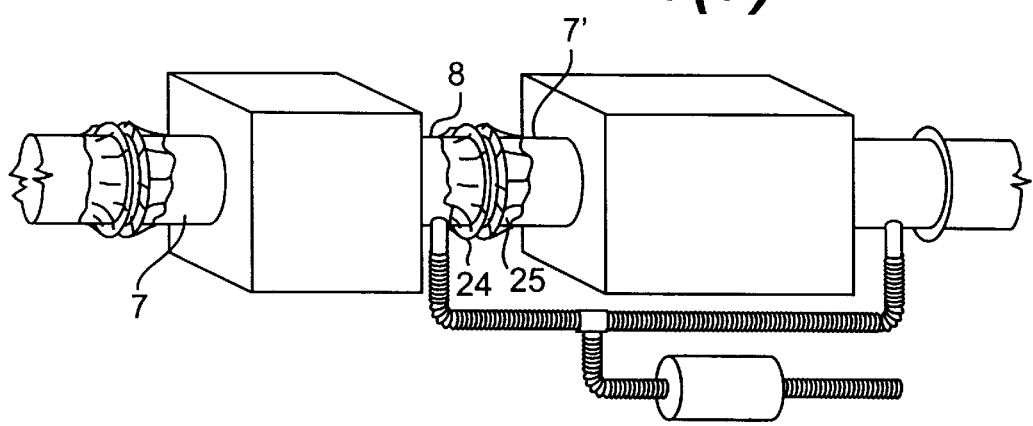
Figure 3C:
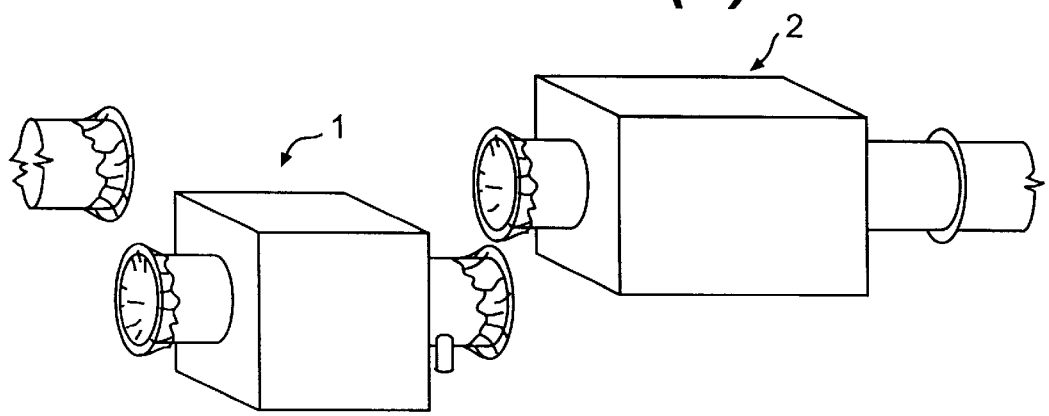

As shown in FIGS. 3(*a*)–(*c*), when a filter module is due for replacement, a vacuum source is connected via flexible tubing 21 and HEPA filter 20 to the vacuum ports provided in the outlet ducts of the modules. These vacuum ports are mounted downstream of the filter elements within the respective modules, and, although shown installed in the outlet ducts from the modules, equally could be formed in the shell casings of the modules, at locations such as to be downstream of the filter elements. The vacuum source creates a negative pressure inside the modules, the normal exhaust flow through exhaust ducts 4 and 5 having been terminated. After creation of the negative pressure in the module interiors, the connecting bolts between duct flange 10 and module inlet flange 9 are removed so as to permit creation of a slight gap between the two flanges, sufficient to permit insertion of a sheet of plastic film 22. Before this sheet is inserted in the gap, airflow created by the negative pressure will be from the outside and from duct 4 into the interior of module 1, so that there is no outflow of contaminated air. Plastic film sheet 22 is then secured about the outlet of duct section 4 to seal this outlet securely by taping the plastic film (typically polyethylene) to the duct section 4. Thereafter a corresponding film sheet 23 is secured about flange 9 and inlet duct 7 of module 1. The disconnected upstream flanges thus are now sealed, and there has been no outflow of contaminated air. The connection between flange 11 of module outlet duct 8 and flange 12 of the optional isolation valve 3 (or equivalent flange of the adjacent module or a duct section) is then disconnected, a small gap created, and the two flanged openings then sealed in the same manner via plastic film sheets 24 and 25. Again, the duct leading into module 1, which is still at negative pressure, remains open until the downstream duct outlet is sealed, after which flanged duct 8 of module 1 is sealed by plastic film sheet 24. Module 1 is then completely sealed against any escape of contaminated air or contaminants. If only module 1 is to be removed, then the vacuum connections are removed from the vacuum ports, and the vacuum ports are recapped. If module 2 is also to be removed, the vacuum connections remain in place, the connection between flanges 10' and 11' is disconnected, and these flanged openings are similarly sealed by plastic film sheets, again leaving the module outlet open until the opening of duct section 5 is sealed by the plastic film, followed by sealing of the flanged outlet of module duct 8'.

The removed module (or modules), sealed and secure, is then disposed of in a prescribed manner, typically by incinerating at an approved incinerating facility. A corresponding replacement module (or modules) is moved into position, connected with the vacuum source via vacuum port 14 to create a negative pressure inside the module, and any plastic sealing film sheets removed from the module ports, the plastic film seals are removed from the duct connections or adjacent connections, and the released connections are again connected to complete the exhaust flow path, followed by terminating the vacuum source communication and closing the vacuum port. Thereafter the exhaust flow through the system may be reinstituted. In installing a new replacement module, it is again an important feature of the invention that the plastic film sheet on the upstream duct connection, e.g., flange 10, is removed first and the upstream duct connection is connected to the module inlet of the new module, followed by removal of the plastic film from the downstream duct connection, e.g., flange 12 or flange 10', and connection thereof with the downstream releasable connecting flange of the new module, such that the more contaminated upstream duct part is reopened and reconnected before reopening and reconnecting of the downstream duct part.

Figure 4:
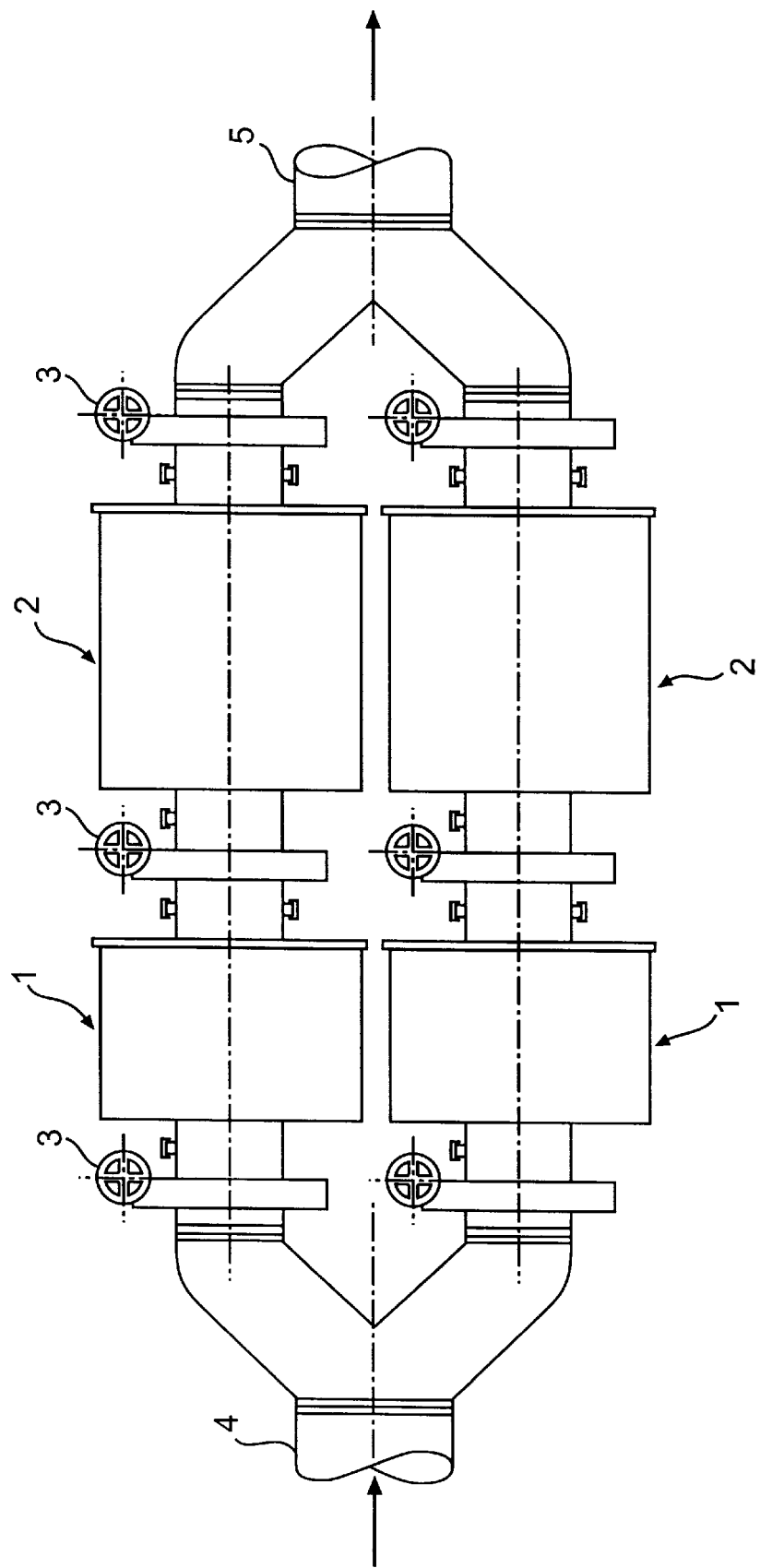

As exemplified by FIG. 4, the disposable filter modules can be incorporated in various ways in a system between spaced duct sections 4 and 5, and isolation valves 3 can be incorporated as desired and/or needed. In the, illustrated example of FIG. 4, the parallel arrangement provides for redundancy, and also permits one of the parallel paths to be isolated for removal and replacement of its modules while the entire flow passes through the other parallel flow path. Various other arrangements can be used.

All test ports and vacuum connections are aluminum welded, and preferably the complete assembly is tested for leak tightness per ANSI/ASME/N 510-1980. Preferably the HEPA filters meet the requirements of IES-RP-001-86 for type A filters. The HEPA filter typically and preferably is calked in place with silicon rubber adhesive/sealant, and held in-place with aluminum clips affixed to the inside of the aluminum housing. After the prefilter and HEPA filter are secured in place in a HEPA filter module, the assembly preferably is tested with dioctylphalate smoke in accordance with IES-RP-001, type A, and should have a minimum efficiency of 99.9%. The carbon filter preferably is constructed such as to provide for a minimum of 0.25 seconds residence time at the rated flow, and the carbon should be impregnated to increase its efficiency on radioactive iodine to 99.5% and to 95% on methyl iodide at 95% relative humidity, in keeping with army standard IDT M16-1T. The carbon filter is held in place with screws and sealed to prevent bypass with silicone rubber adhesive/sealant. The carbon filter module, when completed,. preferably is tested in accordance with IES RP-008-84, and should have a minimum efficiency of 99.9% on Freon 11. The gasketing on the flanges of all modules may typically be ½ inch thick neoprene rubber with minimum hardness durometer of 60. The filter elements themselves are not considered to be novel features of the invention, apart from their incorporation in disposable filter modules as disclosed and claimed.

As typical examples, a disposable HEPA filter module for an exhaust flow of 200 to 1,000 cfm at 99.99% efficiency (DOP) may have a main body shell of approximately 24 inches by 24 inches and a length of 26 inches between the inlet and outlet port flanges, a pressure drop of approximately 1.1 inches water gauge, and an approximate weight of 32 pounds. A carbon filter module for an exhaust flow of 250–500 cfm might have corresponding dimensions of 24 inches by 24 inches and 38 inches between the inlet and outlet port flanges, with a pressure drop of 1.1 inch water gauge, a residence time of 0.25 second and an approximate weight of 190 pounds. A similar carbon filter module for an exhaust flow of 500–625 cfm would have corresponding dimensions except for a length of 40 inches between the inlet and outlet port flanges, and an approximate weight of 210 pounds. As installed, the modules are typically fixedly located in an appropriate support rack or frame of angle iron and in accurate alignment with the spaced duct sections. The optional isolation valves typically are gear type butterfly valves, commercially available. During shipment, the module inlet and outlet ports typically are sealed by a taped plastic film and covered by plywood covers for protection.

The closure of the parallelepiped shaped modules at one end is preferably bolted to the remainder of the unit which is formed by welding, the welding being prior to placement of the filter elements within the module such that the filter elements are protected from damage that might result from being exposed to the heat of the welding assembly process.

Having thus described and illustrated preferred embodiments of my invention, I claim:

1. In a system including an enclosure for containing airborne or potentially airborne biological contamination, exhaust means communicating with said enclosure for exhausting air therefrom for maintaining said enclosure under negative pressure relative to its surroundings, said exhaust means including exhaust ducting and filter means through which exhaust air flows from said enclosure, the improvement comprising said filter means including a substantially rigid integral disposable module releasably but sealingly connected between sections of said ducting for forming an airflow path therethrough, said module comprising a substantially rigid, air-tight hollow body having an inlet and an outlet defined by releasable connecting means located respectively upstream and downstream of each other relative to the direction of airflow therethrough, said hollow body having at least one filter fixedly mounted therein and sealed in said hollow body such that substantially all airflow from said inlet to said outlet passes through said at least one filter, said module being disconnectable from said ducting as an integral unit and to be removable, disposable and replaceable by another such module at the end of the useful life of said at least one filter, said system further including means for decontaminating said at least one filter prior to removal thereof from said system.

2. Apparatus as claimed in claim 1 wherein said ducting is substantially rigid permanent ducting, and said releasable connecting means comprise abutting flanges on said ducting for forming releasable sealed connections between said module and said ducting.

3. Apparatus as claimed in claim 1 wherein said releasable connecting means defining said inlet and said outlet of said hollow body project outwardly from the hollow body so as to be accessible to be encased and sealed by flexible sheet material upon disconnection preparatory to removal of said module from said exhaust ducting.

4. Apparatus as claimed in claim 1 wherein said module further includes a normally closed openable port means for selective connection to a vacuum source for selectively maintaining the module interior under negative pressure when open during removal or installation of said module.

5. Apparatus as claimed in claim 4 wherein said port communicates with the interior of said hollow body downstream of the filter mounted therein.

6. Apparatus as claimed in claim 1 wherein said module consists substantially entirely of incineratable materials.

7. Apparatus as claimed in claim 6 wherein said hollow body is fabricated sheet aluminum.

8. Apparatus as claimed in claim 7 wherein said module is substantially devoid of any major component having a required incineration temperature higher than that of aluminum.

9. Apparatus as claimed in claim 1 wherein said enclosure is selected from the group consisting of contaminated containment room, nuclear facilities, animal rooms or cages for contaminated animals, fume hoods and biological safety cabinets.

10. Apparatus as claimed in claim 1 wherein said airborne or potentially airborne hazardous substances comprise carcinogen-laden air, radioactive gases, biological contaminants, or toxic substances.

11. Apparatus as claimed in claim 1 wherein said at least one filter comprises a HEPA filter for particulate filtration.

12. Apparatus as claimed in claim 1 wherein said at least one filter comprises a carbon filter for removal of gases and vapors.

13. Apparatus as claimed in claim 1 further comprising at least one isolation valve means located downstream of said module for selectively isolating said module from downstream of said exhaust means.

14. Apparatus as claimed in claim 1 wherein said filter means comprises two of said modules connected in series, the upstream module containing a HEPA filter, and the downstream model containing a carbon filter, said system further comprising an isolation valve in the flow path between said modules for selectively isolating the carbon filter module from the HEPA filter module to permit biological or other decontamination of the HEPA filter without adversely affecting the carbon filter.

15. A method of removing a filter module in a system as claimed in claim 1 comprising the steps of terminating exhaust flow through the module, communicating the hollow body interior with a filtered vacuum source via a selectively openable and closable port to effect a negative pressure in the hollow body interior, releasing one of said releasable connecting means of the hollow body from its duct connection and separating the released connecting means from its duct connection by a small gap sufficient to receive at least two sheets of plastic film, inserting said sheets of plastic film in said gap and sealingly securing the film separately over the released connecting means and its released duct connection, repeating the releasing and film securing steps for the other of said releasable connecting means and its duct connection, terminating said vacuum source communication and closing said port, and removing said module as an integral unit and disposing of it.

16. A method as claimed in claim 15 wherein the first released one of said connecting means is the upstream inlet connecting means, and said plastic film is not sealingly secured over said released connecting means before the plastic film is sealingly secured to its released duct connection so that the negative pressure effect in the hollow body interior exists at said gap while said released duct connection is open and at least until it is closed.

17. A method as claimed in claim 16 including installing a new said module in place of said removed module, communicating the hollow body interior of the new module with a filtered vacuum source via a selectively openable and closable port to effect a negative pressure in the hollow body interior of the new module, removing the plastic film from said released duct connections, connecting said releasable connecting means of said hollow body of said new module to their respective duct connections, terminating said vacuum source communication, and closing said port.

18. A method as claimed in claim 17 wherein the plastic film on the upstream duct connection is removed first and the upstream duct connection is connected to the upstream releasable connecting means of the new module, followed by removal of the plastic film from the downstream duct connection and connection thereof with the downstream releasable connecting means of the new module, such that the more contaminated duct part is reopened and reconnected first.

* * * * *